US011103968B2

(12) United States Patent
Tamagawa et al.

(10) Patent No.: US 11,103,968 B2
(45) Date of Patent: Aug. 31, 2021

(54) ROTARY TABLE APPARATUS

(71) Applicant: Mitutoyo Corporation, Kanagawa (JP)

(72) Inventors: Tomoyuki Tamagawa, Hiroshima (JP); Hisayoshi Sakai, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 185 days.

(21) Appl. No.: 16/667,353

(22) Filed: Oct. 29, 2019

(65) Prior Publication Data
US 2020/0130116 A1 Apr. 30, 2020

(30) Foreign Application Priority Data

Oct. 31, 2018 (JP) .............................. JP2018-205064

(51) Int. Cl.
*B23Q 1/26* (2006.01)
*F16C 32/06* (2006.01)

(52) U.S. Cl.
CPC ............ *B23Q 1/26* (2013.01); *F16C 32/0614* (2013.01); *B23Q 2220/004* (2013.01)

(58) Field of Classification Search
CPC .......... B23Q 1/38; B23Q 1/385; B23Q 1/522; B23Q 2220/00; B23Q 2220/004; F16C 32/06; F16C 32/0603; F16C 32/0614; F16C 32/0622; F16C 32/0625; H01L 21/68785; H01L 21/68764; H01L 21/6838
See application file for complete search history.

(56) References Cited

U.S. PATENT DOCUMENTS

| 3,772,961 | A | * | 11/1973 | Siebert | .................... F16C 32/06 409/221 |
| 4,076,339 | A | * | 2/1978 | Schrolucke | .............. B23Q 1/38 384/112 |
| 4,652,148 | A | * | 3/1987 | Olasz | .................... F16C 29/025 310/90 |
| 6,655,672 | B2 | * | 12/2003 | Tsuruta | ............... F16C 32/0696 269/20 |
| 2003/0006756 | A1 | | 1/2003 | Tsuruta | |

FOREIGN PATENT DOCUMENTS

JP 2003-021142 1/2003

* cited by examiner

*Primary Examiner* — Tyrone V Hall, Jr.
(74) *Attorney, Agent, or Firm* — Rankin, Hill & Clark LLP

(57) ABSTRACT

A rotary table apparatus includes: a table part having a placement surface; a support part having a guide surface facing an opposing surface which is on an opposite side of the placement surface of the table part; an air film forming part that forms an air film by supplying compressed air between the guide surface and the opposing surface; a negative pressure generating part that sucks air between the guide surface and the opposing surface; a discharge part formed with a discharge port; and an opening adjusting part that adjust the size of an opening area of the discharge port in accordance with the size of a compressed air pressure corresponding to a load applied to the table part.

13 Claims, 8 Drawing Sheets

ROTARY TABLE APPARATUS

CROSS-REFERENCE TO RELATED APPLICATIONS

The present application claims priority to the Japanese Patent Application number 2018-205064, filed on Oct. 31, 2018. The contents of this application are incorporated herein by reference in their entirety.

BACKGROUND OF THE INVENTION

The present invention relates to a rotary table apparatus having a rotary table.

A rotary table is mounted on, for example, a roundness measuring machine. In the roundness measuring machine, a workpiece, which is an object to be measured, is placed on the rotary table, and while the workpiece is rotated by the rotary table, a surface shape and the like of the workpiece are measured with high accuracy. An aerostatic bearing that forms an air film in a gap with the rotary table is used as a support mechanism for such a rotary table.

In recent years, in view of ensuring the stiffness of the air film even if a load applied to the rotary table from the workpiece is small, a bearing of a vacuum preload system in which air is sucked from the gap to provide a preload has been proposed (see Japanese Unexamined Patent Application Publication No 2003-21142).

However, when the above-mentioned bearing of the vacuum preload system is adopted, a region in which the air film for supporting a load can be formed is narrowed since a part of the gap is used as a region for sucking air. As a result, it may be difficult to adequately support higher loads applied to the rotary table.

BRIEF SUMMARY OF THE INVENTION

This invention focuses on this point, and an object of the invention is to appropriately support a rotary table by an air film even when a wide range of loads are applied to the rotary table.

In one aspect of the present invention, a rotary table apparatus including: a table part that has a placement surface on which a workpiece is mounted and which rotates about a predetermined rotational axis; a support part that has a guide surface facing an opposing surface which is on an opposite side of the placement surface of the table part; an air film forming part that forms an air film by supplying compressed air between the guide surface and the opposing surface, the compressed air flowing through a flow path; a negative pressure generating part that generates a passing negative pressure by increasing flow velocity of passing compressed air to suck air between the guide surface and the opposing surface; a discharge part formed with a discharge port through which the compressed air having passed through the negative pressure generating part and the air sucked by the negative pressure generating part are discharged; and an opening adjusting part that adjusts the size of an opening area of the discharge port of the discharge part in accordance with the size of a compressed air pressure corresponding to a load applied on the table part, the opening adjusting part being connected to the flow path is provided.

BRIEF DESCRIPTION OF THE DRAWINGS

FIGS. 6A and 6B are each a schematic diagram illustrating a gap between a rod 74 and a discharge port 63a.

FIG. 7 is a schematic diagram illustrating a flow of compressed air when the rod 74 closes the discharge port 63a.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment (Outline of a Rotary Table Apparatus)

While referring to FIGS. 1 and 2, an outline of a rotary table apparatus according to the first embodiment of the present invention will be explained.

Figure 1:
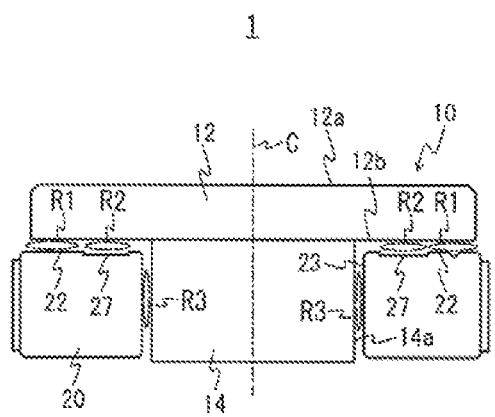
FIG. 1 shows a schematic diagram illustrating a configuration of a rotary table apparatus 1 according to the first embodiment of the present invention.
Figure 2:
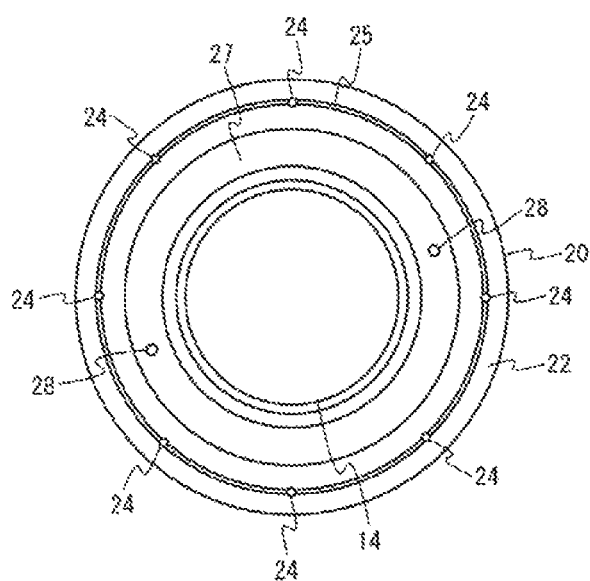
FIG. 2 shows a schematic diagram illustrating a configuration of a guide surface 22 of a support part 20.

FIG. 1 is a schematic diagram illustrating the configuration of the rotary table apparatus 1 according to the first embodiment. FIG. 2 is a schematic diagram illustrating a configuration of a guide surface 22 of a support part 20. The rotary table apparatus 1, on which a workpiece of an object to be measured is placed, is mounted on a roundness measuring machine. The roundness measuring machine measures a surface shape and the like of the workpiece with high accuracy while the rotary table apparatus 1 rotates the workpiece. As shown in FIG. 1, the rotary table apparatus 1 includes a rotary table 10 and the support part 20.

The rotary table 10 is a rotating body that rotates around a predetermined rotation axis. The rotary table 10 includes a table part 12 and a rotor part 14. The table part 12 is disc-shaped and includes a placement surface 12a on which the workpiece is placed. The placement surface 12a is an upper surface of the table part 12. A lower surface 12b of the table part 12 faces the support part 20, the lower surface 12b being an opposite surface that faces the placement surface 12a. The rotor part 14 is provided with a columnar shape at a lower portion of the table part 12, and rotates around a rotation axis C. The rotor part 14 is integrated with the center of the table part 12. The rotor part 14 rotates, for example, based on a drive command from a control apparatus.

The support part 20 supports the rotary table 10 via an air film. The support part 20 functions as an aerostatic bearing. As shown in FIG. 2, the support part 20 is arranged so as to surround the rotor part 14 of the rotary table 10. The support part 20 has a guide surface 22 at the top. The guide surface 22 faces the lower surface 12b of the table part 12 of the rotary table 10.

An air film is formed between the guide surface 22 and the lower surface 12b of the table part 12 to function as a thrust aerostatic bearing. The thrust aerostatic bearing supports the workpiece placed on the table part 12 and controls axial displacement. As shown in FIG. 2, the guide surface 22 is provided with an air supply hole 24, an air supply groove 25, an annular groove 27, and a suction hole 28.

The air supply hole 24 is a hole for supplying compressed air between the lower surface 12b of the table part 12 and the guide surface 22. The compressed air supplied from the air supply hole 24 forms an air film between the lower surface 12b and the guide surface 22 (a region R1 shown in FIG. 1). In the present embodiment, the air supply hole 24 corresponds to an air film forming part. Here, the guide surface 22 has eight air supply holes 24 circumferentially provided at 45 degree intervals thereon.

The air supply groove 25 is an annularly recessed groove in the guide surface 22. The air supply groove 25 communicates with the eight air supply holes 24. The compressed air supplied by the air supply holes 24 flows along the air supply groove 25, thereby forming the air film in a ring-shaped region R1 between the lower surface 12b and the guide surface 22. Providing the air supply groove 25 makes it easier to form an air film having a uniform thickness over a wide area of the guide surface 22.

The annular groove 27 is an annularly recessed groove in the guide surface 22, apart from the air supply groove 25. The annular groove 27 is formed closer to the center than the air supply groove 25 in the guide surface 22. Also, the width of the annular groove 27 is greater than the width of the air supply groove 25.

The suction hole 28 is a hole for sucking air between the lower surface 12b of the table part 12 and the guide surface 22 (a region R2 in FIG. 1). The suction hole 28 sucks air using a negative pressure generated by a negative pressure generating part described later. The suction hole 28 is provided in the annular groove 27. Here, the annular groove 27 has two suction holes 28 provided circumferentially at intervals of 180 degrees. However, the present invention is not limited to this, and for example, four suction holes 28 may be provided circumferentially at 90 degree intervals. The region R2 where the suction holes 28 suck air is located closer to the center than the region R1 where the air supply holes 24 supply air. When the above-mentioned suction holes 28 suck air, a suction force for pulling the table part 12 toward the guide surface 22 side is generated.

Also, the air film is formed between an inner surface 23 of the support part 20 and an outer surface 14a of the rotor part 14 to function as a radial aerostatic bearing (a region R3 in FIG. 1). The radial aerostatic bearing controls radial deflection of a rotation axis of the rotor part 14. In order to form the air film, an air supply hole is also formed on the inner surface 23.

As described above, since the workpiece is placed on the table part 12, a load is applied to the table part 12 from the workpiece. Hereinafter, a relationship between (i) the stiffness of the air film between the lower surface 12b of the table part 12 and the guide surface 22 and (ii) the load will be explained. The stiffness of the air film is defined by using the load and the thickness of the air film (hereinafter also referred to as the film thickness) as in the following Equation (1).

$$k = \frac{\Delta W}{\Delta h} \tag{1}$$

In Equation (1), k represents the stiffness of the air film, $\Delta W$ represents variation in the load applied on the table part 12, and $\Delta h$ represents variation in the thickness of the air film. Further, because $\Delta W = \Delta p \times A$ when assuming that the change in the air pressure after passing through the air supply holes 24 is $\Delta p$ and the bearing effective area (the bearing effective area is substantially constant) is A, the above Equation (1) can be re laced by the following Equation (2).

$$k = A \times \frac{\Delta p}{\Delta h} \tag{2}$$

Figure 3:
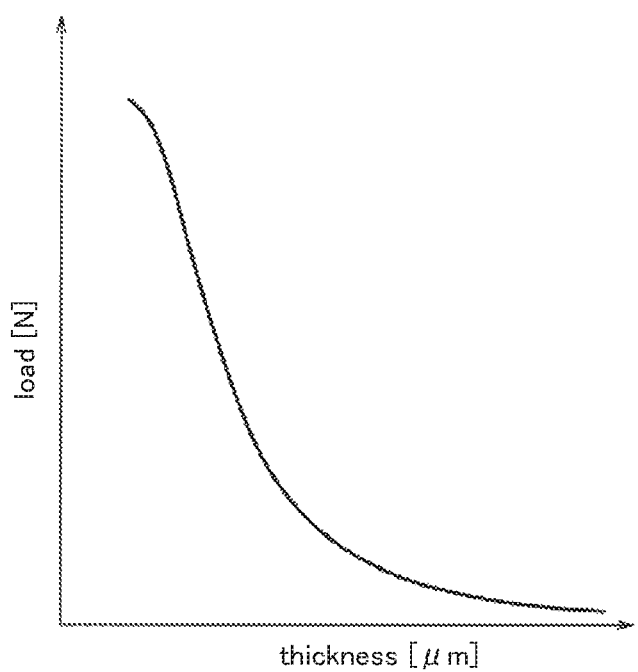
FIG. 3 shows a relationship between a thickness of an air film and a load.

FIG. 3 shows a relationship between the thickness of the air film and the loading. In FIG. 3, the horizontal axis of the graph indicates the thickness [μm] of the air film, and the vertical axis indicates the load [N]. The stiffness k defined by Equation (1) corresponds to the slope of the characteristics curve shown in FIG. 3. As can be seen from FIG. 3, in the range where the thickness of the air film is small (hereinafter, also referred to as the first range), the slope is steep at the approximately linear part in this characteristic curve, and the stiffness of the air film is high. Therefore, even if the load fluctuates in the first range, the fluctuation of the thickness of the air film is small and the air film is maintained in a stable state. On the other hand, in a range in which the thickness of the air film is large (hereinafter, also referred to as a second range), the slope of the curves is gentle, and the stiffness of the air film is low. For this reason, when the load fluctuates in the second range, the thickness of the air film also fluctuates, and the air film becomes unstable.

In order to enhance the stiffness of the air film between the guide surface 22 and the lower surface 12b and to maintain the stable state, it is desirable to use it within a load range corresponding to the approximately linear part in the characteristic curve of FIG. 3. Therefore, when the load acting on the table part 12 from the workpiece is small, the air is sucked from the suction holes 28 to generate a preload for attracting the table part 12 toward the guide surface 22. This makes it possible to use the air film in the region of the approximately linear part in the characteristic curve even if the load acting on the workpiece the table part 12 is small, and it is possible to enhance the stiffness of the air film.

On the other hand, in the case where the guide surface 22 has the suction holes 28, a part of the region R2 between the guide surface 22 and the lower surface 12b is used as the suction region, so that the air supply region between the guide surface 22 and the lower surface 12b (i.e., the region R1) is narrower compared to the case where the region R2 has no suction hole 28, and the maximum load supported by the air film is reduced. On the other hand, in the present embodiment, as will be described in detail later, by providing a flow rate adjusting part for adjusting the suction of air by the suction holes 28 in accordance with the load applied on the table part 12, it is possible to prevent a reduction in the maximum load supported by the air film.

<Configurations of an Air Supply Route and a Suction Route>

An example of configurations of an air supply route through which compressed air flows and an air suction route through which sucked air (hereinafter also referred to as suctioned air) flows will be explained with reference to FIG. 4.

Figure 4:
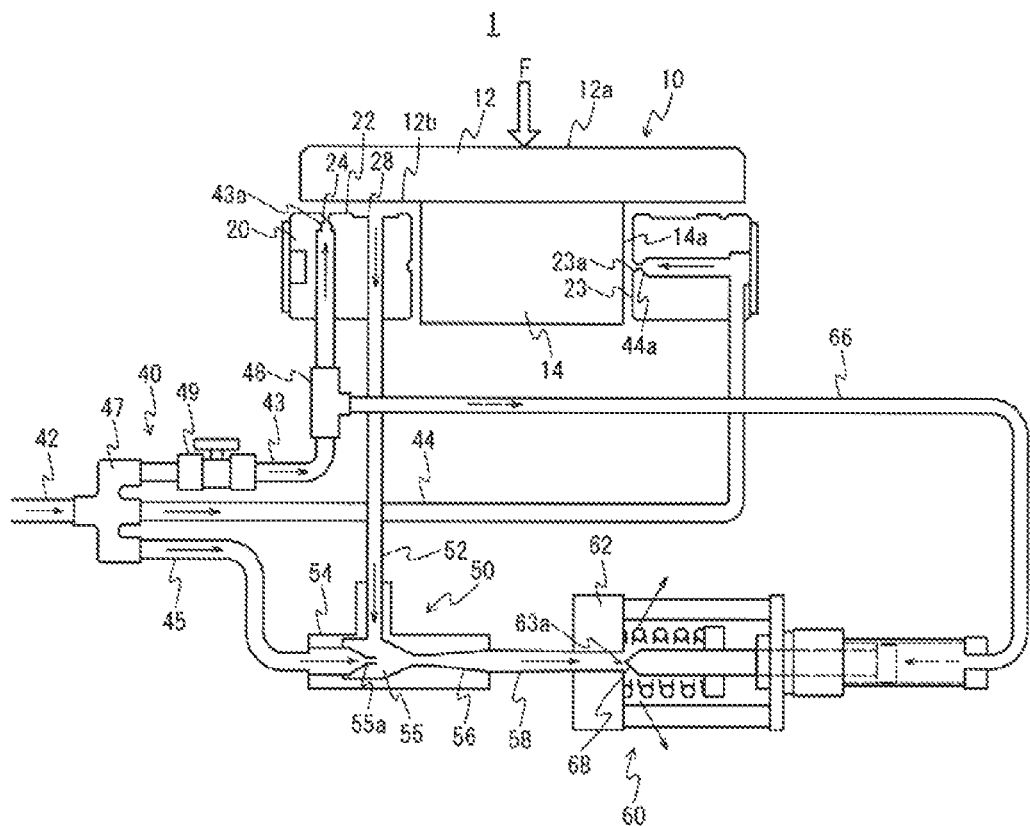
FIG. 4 is a schematic diagram illustrating configurations of an air supply route and a suction route according to the first embodiment.

FIG. 4 is a schematic diagram illustrating the configurations of the air supply route and a suction route according to the first embodiment. In FIG. 4, flows of the compressed air and the suctioned air are indicated by arrows. As shown in FIG. 4, the rotary table apparatus 1 includes an air supply route 40, a suction route 50, and a discharge part 60, in addition to the rotary table 10 and the support part 20.

The air supply route 40 is a route through which compressed air for forming the air film flows. The air supply route 40 has air supply paths 42, 43, 44, and 45.

The air supply path 42 is, for example, a flow path having one end side connected to a compressor. The compressed air supplied from the compressor flows through the air supply path 42. The other end side of the air supply path 42 is connected to a fitting 47. The air supply paths 43, 44, and 45 are connected to the fitting 47, and the compressed air flowing through the air supply path 42 is diverted to the air supply paths 43, 44, and 45 via the fitting 47.

The air supply path 43 is a flow path enabling the compressed air to flow toward the air supply holes 24 of the support part 20. One end side of the air supply path 43 is connected to the fitting 47, and the other end side of the air supply path 43 passes through the support part 20 and is connected to the air supply holes 24. Then, the compressed air flowing through the air supply path 43 is supplied from the air supply holes 24 to form an air film between the guide surface 22 and the lower surface 12b of the table part 12 in the region R1. A restrictor 43a is formed at the other end of the air supply path 43, and the compressed air passed through the restrictor 43a is supplied from the air supply holes 24.

A fitting 48 is provided in the middle of the air supply path 43. A propagation path 66, which will be described later, is connected to the fitting 48 so as to branch from the air supply path 43. A flow rate regulating valve 49 is provided on the upstream side of the fitting 48 of the air supply path 43. The flow rate regulating valve 49 is a valve for regulating the flow rate of the compressed air flowing through the air supply path 43.

The air supply path 44 is a flow path through which compressed air flows toward the air supply hole 23a formed on an inner surface 23 of the support part 20. One end side of the air supply path 44 is connected to the fitting 47, and the other end side of the air supply path 44 passes through the support part 20 and is connected to the air supply hole 23a The compressed air flowing through the air supply path 44 is supplied from the air supply hole 23a to form an air film between the inner surface 23 and an outer surface 14a of the rotor part 14. A restrictor 44a is formed at the other end of the air supply path 44, and compressed air passed through the restrictor 44a is supplied from the air supply hole 23a.

The air supply path 45 is a flow path through which compressed air flows toward the vacuum ejector 54 of the suction route 50. One end side of the air supply path 45 is connected to the fitting 47, and the other end side of the air supply path 45 is connected to the vacuum ejector 54.

The suction route 50 is a route for sucking air from between the guide surface 22 and the lower surface 12b of the table part 12 (region R2). The suction route 50 includes a suction path 52, the vacuum ejector 54, and a connection path 58.

The suction path 52 is a flow path through which the air sucked from the suction holes 28 flows. One end side of the suction path 52 is connected to the suction holes 28, and the other end side of the suction path 52 is connected to the vacuum ejector 54. The air sucked from between the guide surface 22 and the lower surface 12b (region R2) via the suction holes 28 flows through the suction path 52 to the vacuum ejector 54.

The vacuum ejector 54 has a function of generating a negative pressure by using the compressed air flowing from the air supply path 45. The vacuum ejector 54 has a negative pressure generating part 55 and a diffuser part 56 therein.

The negative pressure generating part 55 increases flow velocity of the compressed air passing through the inside of the vacuum ejector 54 to generate a negative pressure for sucking the air between the guide surface 22 and the lower surface 12b. Generating such a negative pressure enables preloading between the guide surface 22 and the lower surface 12b, and the stiffness of the air film is enhanced.

The negative pressure generating part 55 has a nozzle part 55a formed at the other end of the air supply path 45. The nozzle part 55a is a restrictor that restricts the air supply path 45 and increases the flow velocity of the compressed air. The nozzle part 55a is formed in a conical shape, for example, and increases the flow velocity of the compressed air at a tip of the nozzle. When the flow velocity of the compressed air at the nozzle tip increases, the pressure around the nozzle tip decreases.

The tip of the nozzle part 55a is adjacent to an opening at the other end side of the suction path 52. The negative pressure is generated in a direction orthogonal to the flow of compressed air in accordance with the Bernoulli's principle of negative pressure generation. Here, a negative pressure is generated in a direction from the suction holes 28 to the nozzle part 55a via the suction path 52. By generating such a negative pressure, the air sucked from the suction holes 28 flows into the diffuser part 56 through the suction path 52.

The diffuser part 56 is a part that decreases the flow velocity of the suctioned air and compressed air, and increases the pressure. The diffuser part 56 is formed so that its inner diameter gradually increases toward the direction of airflow.

The connection path 58 is a flow path connecting the vacuum ejector 54 and the discharge part 60. One end of the connection path 58 is connected to the diffuser part 56 of the vacuum ejector 54, and the other end of the connection path 58 is connected to the discharge part 60. The suctioned air or compressed air that passed through the diffuser part 56 flows through the connection path 58 to the discharge part 60. It should be noted that the present invention is not limited to the above-described configuration, and for example, the vacuum ejector 54 and the discharge part 60 may be directly connected to each other without the connection path 58.

The discharge part 60 discharges the compressed air and suctioned air flowing from the vacuum ejector 54 via the connection path 58 to the outside. The discharge part 60 adjusts a discharge amount of the compressed air and suctioned air in accordance with the load applied on the table part 12. The discharge part 60 includes a housing 62, a propagation path 66, and an opening adjusting part 68.

Figure 5:
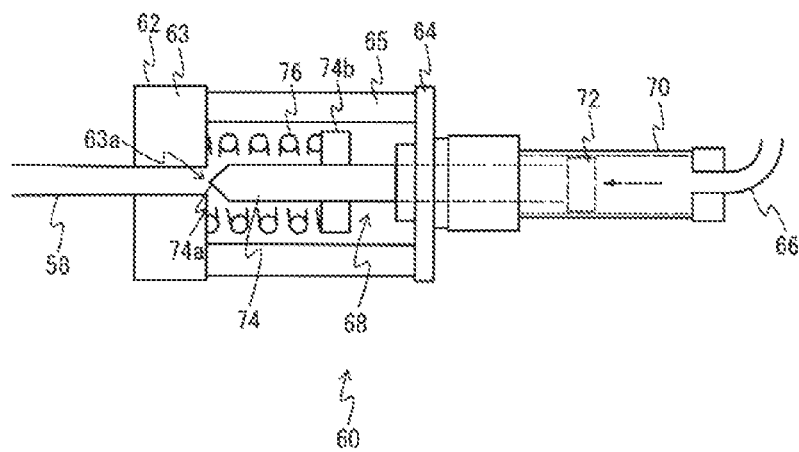
FIG. 5 is a schematic diagram illustrating a detailed configuration of a discharge part 60.

FIG. 5 is a schematic diagram illustrating a detailed configuration of the discharge part 60. The housing 62 includes a base block 63, a plate 64, and a support post 65.

The base block 63 is provided with a discharge port 63a. The discharge port 63a is connected to one end side of the connection path 58. The discharge port 63a is an opening for discharging the compressed air and suctioned air that have passed through the negative pressure generating part 55.

Two support posts 65, for example, are provided, and connect the base block 63 and the plate 64. A space between the two support posts 65 is a space in which the suctioned air and compressed air discharged from the discharge port 63a are directed to the outside of the housing 62 (see FIG. 4).

The propagation path 66 branches from the air supply path 43 and is a path through which a compressed air pressure of the air supply path 43 is propagated. One end side of the propagation path 66 is connected to the fitting 48 of the air supply path 43, and the other end side of the propagation path 66 is connected to the opening adjusting part 68. The propagation path 66 causes the compressed air pressure of the air supply path 43 to propagate to the opening adjusting part 68.

The compressed air of the air supply path 43 forms the air film for supporting the workpiece mounted on the table part 12 as described above. For this reason, the compressed air pressure changes in conjunction with the load (load F shown in FIG. 4) acting on the table part 12 from the workpiece. For example, the magnitude of the compressed air pressures is proportional to the magnitude of the load acting on the table part 12 from the workpiece. The compressed air pressure, which changes in magnitude according to the load in this manner, is propagated to the opening adjusting part 68 via the propagation path 66.

The opening adjusting part 68 adjusts an opening area of the discharge port 63a in accordance with the magnitude of the compressed air pressure propagated through the propagation path 66. The opening adjusting part 68 increases the opening area of the discharge port 63a to facilitate the suction of air from between the guide surface 22 and the lower surface 12b when the compressed air pressure is low (in other words, when the load applied on the table part 12 is low). On the other hand, when the compressed air pressure is high (in other words, when the load applied on the table part 12 is large), the opening adjusting part 68 reduces the opening area of the discharge port 63a to suppress the suction of air from between the guide surface 22 and the lower surface 12b. In this manner, the preload is adjusted in accordance with the load applied on the table part 12, thereby suppressing the fluctuation of the thickness of the air film.

As shown in FIG. 5, the opening adjusting part 68 includes a cylinder 70, a piston 72, a rod 74, and a compression spring 76. The cylinder 70 is connected to the propagation path 66. The cylinder 70 is formed with a cylindrical shape, and the compressed air pressure is propagated into the cylinder 70 from the pressure propagation path 66.

The piston 72 is provided such that the piston 72 is movable in the axial direction in the cylinder 70. The piston 72 moves back and forth in the axial direction upon receiving the compressed air pressure propagated into the cylinder 70.

The rod 74 is a shaft member connected to the piston 72. The rod 74 moves in the axial direction together with the piston 72. That is, the rod 74 moves upon receiving the compressed air pressure corresponding to the load applied to the table part 12. Specifically, the rod 74 moves back and forth in the axial direction in response to a fluctuation of the compressed air pressure corresponding to a fluctuation of the load applied to the table part 12.

The rod 74 has a tip end 74a adjacent to the discharge port 63a. The tip end 74a is located in the housing 62. As the rod 74 moves in the axial direction, the tip end 74a adjusts the size of a gap between the discharge port 63a and the rod 74.

Figure 6A:
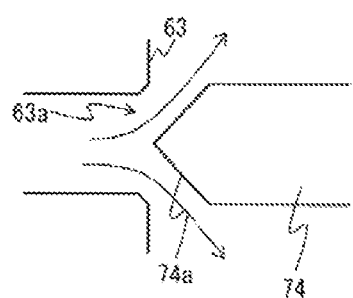
Figure 6B:
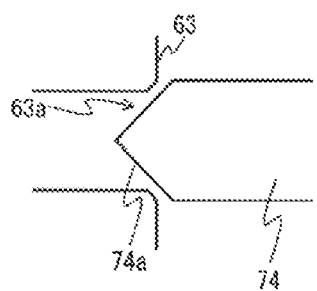

FIGS. 6A and 6B are each a schematic drawing illustrating the gap between the rod 74 and the discharge port 63a. For example, when the rod 74 shown in FIG. 6A is displaced to a state shown in FIG. 6B, the gap between the discharge port 63a and the tip end 74a becomes small. In this manner, the opening area of the discharge port 63a is adjusted by the rod 74.

As shown in FIG. 5, the compression spring 76 is a biasing member provided between a flange part 74b connected to the rod 74 and the base block 63. The rod 74 is biased backward in the axial direction by a biasing force of the compression spring 76. When the compressed air pressure propagated in the cylinder 70 is greater than the biasing force of the compression spring 76, the rod 74 advances forward (approaches the discharge port 63a) against the biasing force. On the other hand, when the compressed air pressure decreases, the rod 74 moves backward (draws away from the discharge port 63a) due to the biasing force of the compression spring 76.

The opening adjusting part 68 stops the suction of air by the negative pressure generating part 55 by closing the discharge port 63a. That is, when the tip end 74a of the rod 74 closes the discharge port 63a, no air flows toward the discharge port 63a, and no air is sucked by the negative pressure generating part 55. Instead, the compressed air flowing from the air supply path 45 to the negative pressure generating part 55 flows through the suction path 52 to the suction holes 28.

Figure 7:
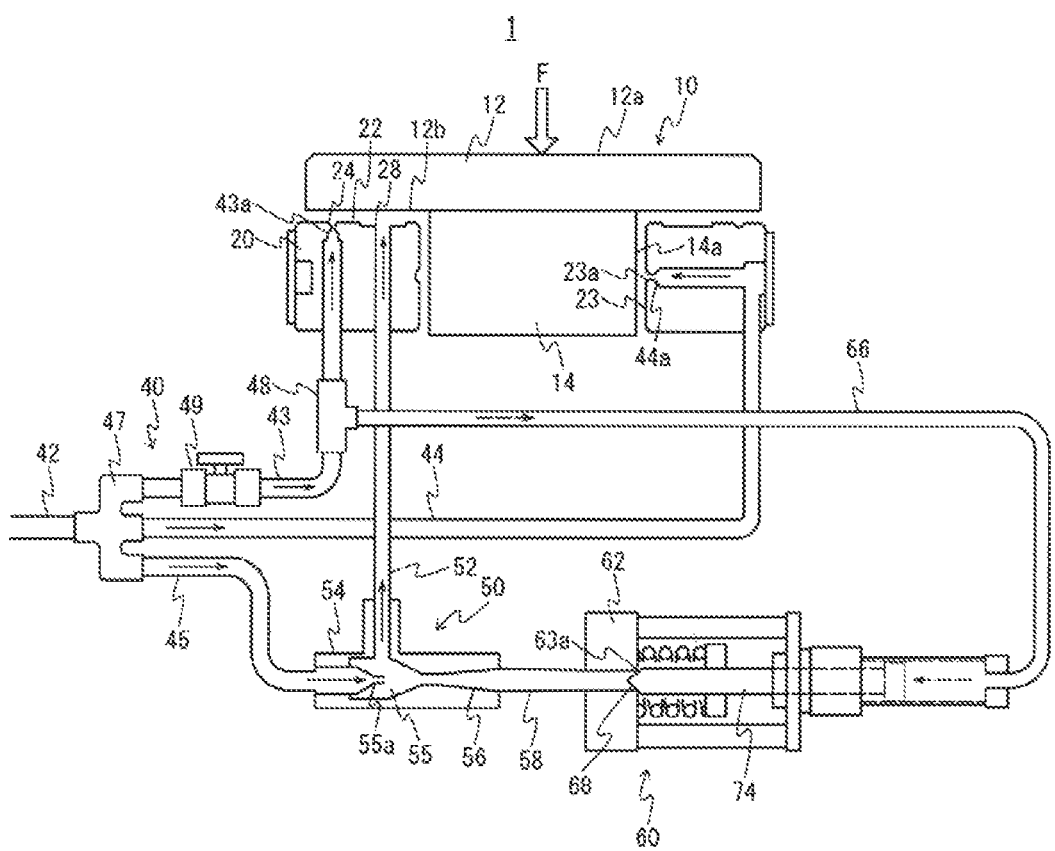

FIG. 7 is a schematic drawing illustrating the flow of compressed air when the rod 74 closes the discharge port 63a. When the rod 74 closes the discharge port 63a, the compressed air that has passed through the nozzle part 55a is not directed to the discharge port 63a, but is directed to the suction holes 28 via the suction path 52, as shown in FIG. 7. That is, the compressed air that has passed through the nozzle part 55a flows through the suction path 52, instead of the air sucked from the suction holes 28 flowing through the suction path 52. The compressed air flowing through the suction path 52 flows from the suction holes 28 between the guide surface 22 and the lower surface 12b, and an air film is also formed in the region R2. That is, a region of the air film (region R1 and region R2) when the discharge port 63a is closed is wider than the region of the air film (region R1) when the discharge port 63a is open.

When the rod 74 closes the discharge port 63a, compressed air is supplied from the air supply holes 24 and the suction holes 28 so that the air film can be formed in a wide region between the guide surface 22 and the lower surface 12b. That is, because the air film can be maximally formed between the guide surface 22 and the lower surface 12b, a load applied on the rotary table 10 can be supported with the nozzle part 55a, serving as the aerostatic bearing with a fluid restrictor, even when the load increases.

Therefore, when the compressed air having passed through the nozzle part 55a is supplied from the suction holes 28 to the region R2, an air film can be formed in the same manner as when the compressed air having passed through the restrictor 43a provided at the other end of the air supply path 43 is supplied from the air supply holes 24 without providing a restrictor in the vicinity of the suction holes 28 of the suction path 52. On the other hand, by not providing a restrictor in the suction path 52, it is possible to appropriately suck the air from between the guide surface 22 and the lower surface 12b.

(Flow of the Compressed Air and Suctioned Air)

The flow of compressed air and suctioned air when the rotary table 10 rotates will be explained with reference to FIG. 4.

First, the compressed air flowing through the air supply path 42 is diverted at the fitting 47 to three air supply paths 43, 44, and 45. The compressed air diverted to the air supply path 43 flows through the air supply path 43 and passes through the restrictor 43a, and then is supplied from the air supply holes 24. As a result, an air film is formed between the guide surface 22 and the lower surface 12b by the supplied compressed air in the region R1.

The compressed air diverted to the air supply path 44 flows through the air supply path 44 and passes through the restrictor 44a, and then is supplied from the air supply hole 23a. As a result, an air film is formed by the supplied compressed air between the inner surface 23 and the outer surface 14a (region R3).

The compressed air diverted to the air supply path 45 flows through the air supply path 45 and passes through the nozzle part 55a of the negative pressure generating part 55. The flow velocity of the compressed air is increased by the nozzle part 55a, and a negative pressure is generated. This negative pressure causes the air between the guide surface 22 and the lower surface 12b (region R2) to be drawn from the suction holes 28 and flow through the suction path 52 to the negative pressure generating part 55. Then, the compressed air and the suctioned air flow to the discharge part 60 and are discharged from the discharge port 63a.

On the other hand, the compressed air pressure flowing through the air supply path 43 (i) fluctuates according to the load acting on the rotary table 10 from the workpiece, (ii) is converted into the displacement of the rod 74 via the propagation path 66, and (iii) is propagated to the opening adjusting part 68. The opening adjusting part 68 adjusts the opening area of the discharge port 63a in accordance with the propagated compressed air pressure to adjust a discharge amount of compressed air and suctioned air. At this time, the opening adjusting part 68 automatically adjusts the opening area of the discharge port 63a by moving the rod 74 back and forth. While the rotary table 10 is rotating, the above-mentioned flows of compressed air and suctioned air continue to occur.

<Effect of the First Embodiment>

The rotary table apparatus 1 of the first embodiment described above includes: the discharge port 63a through which the compressed air and suctioned air that have passed through the negative pressure generating part 55 are discharged; and the opening adjusting part 68 that adjusts the size of the opening area of the discharge port 63a in accordance with the load applied on the rotary table 10. When the load applied on the rotary table 10 is small, the opening adjusting part 68 (i) increases the opening area of the discharge port 63a, (ii) promotes the suction of air from between the guide surface 22 and the lower surface 12b, and (iii) increases the preload. On the other hand, when the load applied on the rotary table 10 is large, the opening adjusting part 68 reduces the opening area of the discharge port 63a to suppress the suction of the air from between the guide surface 22 and the lower surface 12b, and thereby reduces the preload. As a result, the preload corresponding to the load applied on the rotary table 10 can be automatically adjusted (i.e., the film thickness of the air film can be adjusted) so that an air film capable of coping with a wide range of loads can be easily formed.

Hereinafter, a result of an experiment according to the configuration of the first embodiment will be explained in comparison with a comparative example. In the comparative example, its configuration does not include the opening adjusting part 68 provided in the first embodiment, and so discharge amounts of compressed air and suctioned air discharged from a discharge port are unadjusted.

Figure 8:
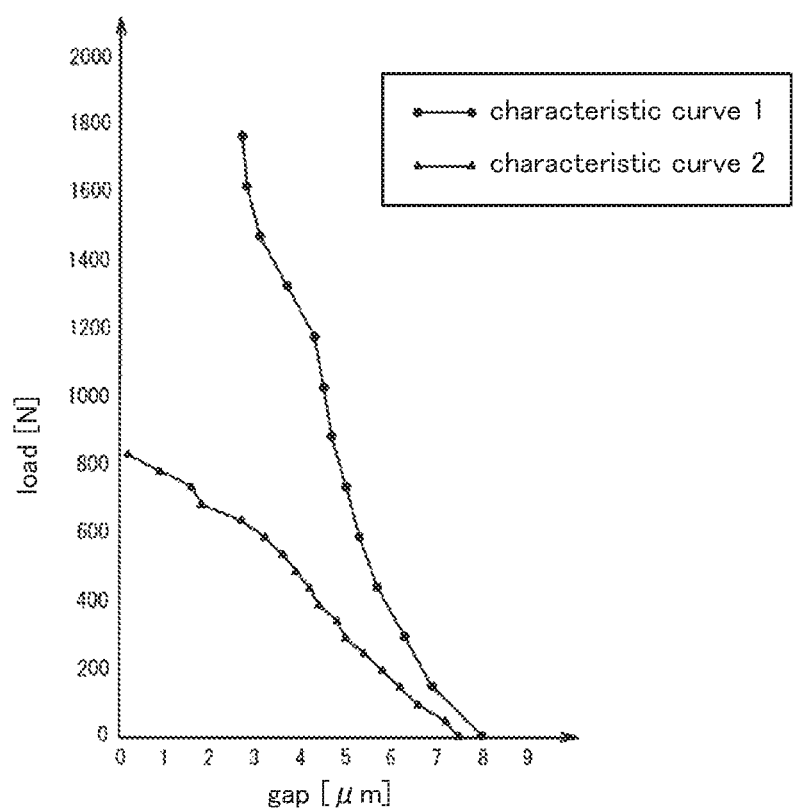
FIG. 8 shows results of experiments.

FIG. 8 is a diagram showing the results of experiments. FIG. 8 shows the result of the experiment according to the configuration of the first embodiment (characteristic curve 1 connecting black circles) and the result of the experiment according to a configuration of the comparative example (characteristic curve 2 connecting black triangles). As can be seen from FIG. 8, by providing the opening adjusting part 68 as in the first embodiment, the magnitude of the maximum load on the characteristic curve 1 is about twice as large as that of the comparative example (the maximum load on the characteristic curve 2). Further, since the slope of the characteristic curve 1 corresponding to the first embodiment is steeper than the slope of the characteristic curve 2 corresponding to the comparative example, it can be said that the stiffness of the air film of the first embodiment is higher than the stiffness of the air film of the comparative example.

<Variation Example>

In the above description, the annular groove 27 formed in a ring shape and recessed in a radial direction by a certain width (see FIG. 2) has the suction holes 28 of the guide surface 22 of the support part 20. However, the present invention is not limited to this, and may be configured as shown in FIG. 9.

Figure 9:
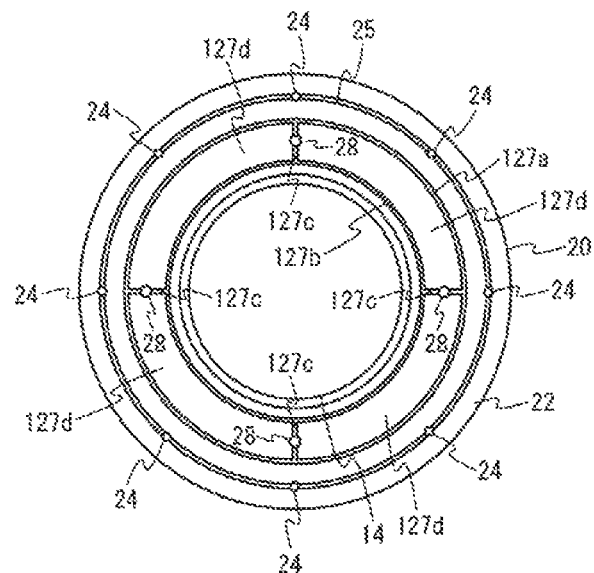
FIG. 9 is a schematic diagram illustrating a configuration according to Variation example of a guide surface 22 of a support part 20.

FIG. 9 is a schematic diagram illustrating a configuration according to a Variation example of the guide surface 22 of the support part 20. In the Variation example, four suction holes 28 are provided circumferentially at 90 degree intervals. Also, instead of the annular groove 27 of FIG. 2, an outer narrow groove 127a, a central narrow groove 127b, a connecting groove 127c, and a flat part 127d are formed in a portion corresponding to the region R2 of FIG. 1.

The outer narrow groove 127a is a groove formed in a ring shape radially outward from the suction holes 28. The width of the outer narrow groove 127a is smaller than the diameter of the suction hole 28. The central narrow groove 127b is a groove formed in a ring shape on the central side of the suction holes 28 in the radial direction. Here, the width of the central narrow groove 127b is the same as the width of the outer narrow groove 127a.

The connecting groove 127c is a groove connecting the outer narrow groove 127a and the central narrow groove 127b. The suction holes 28 are located in the connecting groove 127c. Here, the width of the connecting groove 127c is smaller than the diameter of the suction hole 28 and is the same as the width of the outer narrow groove 127a and the central narrow groove 127b. The outer narrow groove 127a, the central narrow groove 127b, and the connecting groove 127c function as a flow path through which the air sucked by the suction holes 28 flows.

The flat part 127d is a fan-shaped part surrounded by the outer narrow groove 127a, the central narrow groove 127b, and the connecting g groove 127c. Unlike the outer narrow groove 127a, the central narrow groove 127b, and the connecting groove 127c, the flat part 127d is not a groove and has a flat surface. Because the flat part 127d is surrounded by the outer narrow groove 127a and the central narrow groove 127b, air in the part of the flat part 127d is also sucked by the suction holes 28 (i.e., the air in the part of the flat part 127*d* becomes a negative pressure).

Second Embodiment

A configuration of the rotary table apparatus 1 according to the second embodiment will be explained with reference to FIGS. 10 and 11. It should be noted that configurations not described below are the same as those of the first embodiment.

Figure 10:
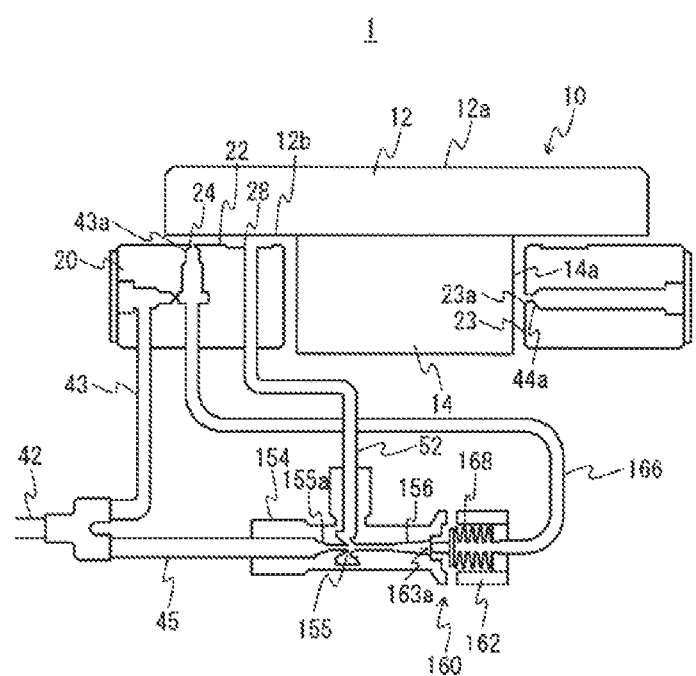
FIG. 10 is a schematic diagram illustrating a configuration of the rotary table apparatus 1 according to the second embodiment.

FIG. 10 is a schematic diagram illustrating the configuration of the rotary table apparatus 1 according to the second embodiment. In the second embodiment, as shown in FIG. 10, the compressed air flowing through the air supply path 43 is diverted in the support part 20 toward the air supply holes 24 and an air supply hole 23*a*, thereby forming the air film of the region R1 and the region R3 described in the first embodiment.

In the first embodiment, the vacuum ejector 54 and the discharge part 60 are connected via the connection path 58, while in the second embodiment, the vacuum ejector 154 and the discharge part 160 are formed integrally. Also, a configuration of an opening adjusting part 168 of the discharge part 160 differs from the configuration of the opening adjusting part 68 of the first embodiment.

The vacuum ejector 154 uses the compressed air flowing from the air supply path 45 to generate a negative pressure. The vacuum ejector 154 has a negative pressure generating part 155 and a diffuser part 156. The negative pressure generating part 155 has a nozzle part 155*a* for increasing flow velocity of the compressed air to generate a negative pressure. This negative pressure causes the air sucked from the suction holes 28 to flow through the suction path 52 to the diffuser part 156. The suctioned air, along with the compressed air, flows through the diffuser part 156 to the discharge part 160.

The discharge part 160 discharges the compressed air and suctioned air flowing from the vacuum ejector 154 to the outside. In a similar manner as the first embodiment, the discharge part 160 adjusts a discharge amount of compressed air and suctioned air in accordance with the load applied on the table unit 12. The discharge part 160 includes a housing 162, a propagation path 166, and an opening adjusting part 168.

Figure 11:
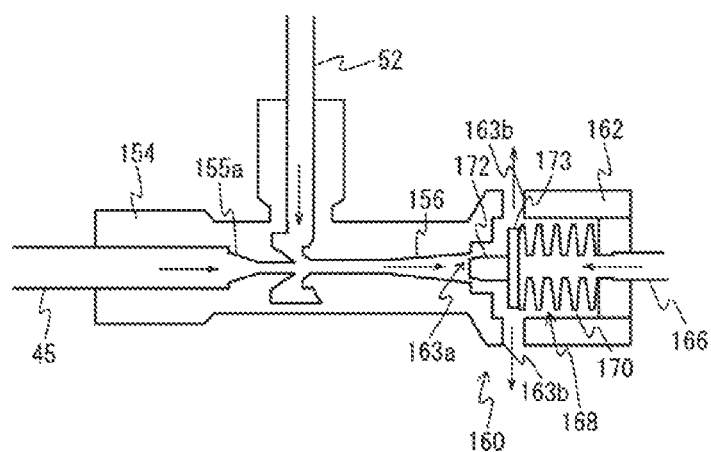
FIG. 11 is a schematic diagram illustrating a detailed configuration of the vacuum ejector 154 and a discharge part 160.

FIG. 11 is a schematic diagram illustrating a detailed configuration of the discharge part 160. The housing 162 is a cylindrical part having a space therein. The housing 162 has a communication port 163*a* and an air port 163*b*.

The communication port 163*a* is an opening for communicating with the diffuser part 156 of the vacuum ejector 154. The compressed air and suctioned air flowing from the vacuum ejector 154 are discharged through the communication port 163*a*. In the second embodiment, the communication port 163*a* corresponds to a discharge port through which the compressed air and suctioned air are discharged. The air port 163*b* is an opening for allowing the compressed air and suctioned air that have passed through the communication port 163*a* to go to the outside (atmosphere). The air port 163*b* is provided on the outer surface of the housing 162.

In a similar manner as the propagation path 66 of the first embodiment, the propagation path 166 branches from the air supply path 43, and is a path through which the compressed air of the air supply path 43 is propagated. The propagation path 166 is connected to the opening adjusting part 168 and propagates the compressed air pressure of the air supply path 43 to the opening adjusting part 168.

The opening adjusting part 168 adjusts an opening area of the communication port 163*a* in accordance with the magnitude of the compressed air pressure propagated via the propagation path 166. The opening adjusting part 168 increases the opening area of the communication port 163*a* to facilitate the suction of air from between the guide surface 22 and the lower surface 12*b* when the compressed air pressure is low (in other words, when the load applied on the table part 12 is low). On the other hand, the opening adjusting part 168 reduces the opening area of the communication port 163*a* when the compressed air pressure is high (in other words, when the load applied on the table part 12 is high), and suppresses the suction of air from between the guide surface 22 and the lower surface 12*b*. In this manner, the preload is adjusted in accordance with the load applied on the table part 12, thereby suppressing the fluctuation of the thickness of the air film.

Here, the opening adjusting part 168 is provided in the housing 162. The opening adjusting part 168 has a bellows 170 that is an elastic member, and a pillar part 172. In the second embodiment, the bellows 170 and the pillar part 172 correspond to a moving member.

The bellows 170 has a bellows shape, and its first end is connected to the propagation path 166. Inside the bellows 170, a cavity is formed through which the compressed air pressure is propagated from the propagation path 166. The bellows 170 expands and contracts in the axial direction in the housing 162 upon receiving the compressed air pressure propagated from the propagation path 166. The bellows 170 is, for example, a plurality of stacked annular thin metal plates, and an expandable cavity is formed by circumferentially joining inner peripheral edges and outer peripheral edges of the annular thin plates. It should be noted that having the bellows 170 provided in the housing 162 as a moving member is effective in the point that it eliminates the need for friction factors such as packing which may be required when a piston is provided in a cylinder, to serve as the moving member.

The pillar part 172 has, for example, a conical shape, and is connected to the other end side of the bellows 170 via a plate 173. The pillar part 172 is provided so as to protrude from the bellows 170 in the axial direction. The pillar part 172 moves in the axial direction in conjunction with expansion and contraction of the bellows 170. For example, when the bellows 170 extends, the tip side of the pillar part 172 enters the diffuser part 156 from the communication port 163*a*. The pillar part 172 moves relative to the communication port 163*a* as the bellows 170 expands and contracts to adjust a gap with the communication port 163*a*. As a result, the discharge amount of compressed air and suctioned air that pass through the communication port 163*a* to be discharged from the air port 163*b* can be adjusted.

When the pillar part 172 closes the communication port 163*a*, the negative pressure generating part 155 stops the suction of air in the second embodiment as well. In other words, when the pillar part 172 closes the communication port 163*a*, no air flows toward the communication port 163*a*, and no air is sucked by the negative pressure generating part 155. The compressed air flowing from the air supply path 45 to the negative pressure generating part 155 flows through the suction path 52 and is supplied from the suction holes 28 to form an air film.

The rotary table apparatus 1 of the second embodiment described above includes: the communication port 163*a* through which the compressed air and suctioned air that have passed through the negative pressure generating part 55 are discharged; and the opening adjusting part 168 that adjusts the size of the opening area of the communication port 163*a* in accordance with the load applied on the rotary table 10. As a result, the preload corresponding to the load applied on the rotary table 10 can be automatically adjusted, in a similar manner as the first embodiment, by having the opening adjusting part 168 adjust the opening area of the communication port 163*a*, so that an air film capable of coping with a wide range of loads can be easily formed in the second embodiment as well.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A rotary table apparatus comprising:
   a table part that has a placement surface on which a workpiece is mounted and which rotates about a predetermined rotational axis;
   a support part that has a guide surface facing an opposing surface which is on an opposite side of the placement surface of the table part;
   an air film forming part that forms an air film by supplying compressed air between the guide surface and the opposing surface, the compressed air flowing through a flow path;
   a negative pressure generating part that generates a passing negative pressure by increasing flow velocity of passing compressed air to suck air between the guide surface and the opposing surface;
   a discharge part formed with a discharge port through which the compressed air having passed through the negative pressure generating part and the air sucked by the negative pressure generating part are discharged; and
   an opening adjusting part that adjusts the size of an opening area of the discharge port of the discharge part in accordance with the size of a compressed air pressure corresponding to a load applied on the table part, the opening adjusting part being connected to the flow path.

2. The rotary table apparatus according to claim 1 further comprising
   a propagation path that propagates the compressed air pressure corresponding to the load applied on the table part to the opening adjusting part, wherein
   the opening adjusting part adjusts the size of the opening area according to the compressed air pressure propagated via the propagation path.

3. The rotary table apparatus according to claim 2, further comprising
   an air supply path through which the compressed air forming the air film flows, wherein
   the propagation path branches from the air supply path and is connected to the opening adjusting part.

4. The rotary table apparatus according to claim 2, wherein
   the opening adjusting part increases the opening area to facilitate suction of air between the guide surface and the opposing surface when the compressed air pressure propagated via the propagation path is low, and reduces the size of the opening area to suppress the suction of air between the guide surface and the opposing surface when the compressed air pressure propagated via the propagation path is high.

5. The rotary table apparatus according to claim 1, wherein the opening adjusting part stops the suction of air by the negative pressure generating part by closing the discharge port.

6. The rotary table apparatus according to claim 5 further comprising
   a suction path through which air sucked from between the guide surface and the opposing surface flows to the negative pressure generating part, wherein
   the opening adjusting part supplies, between the guide surface and the opposing surface, the compressed air forming the air film via the suction path by closing the discharge port.

7. The rotary table apparatus according to claim 6, wherein a region of the air film formed between the guide surface and the opposite surface while the opening adjusting part closes the discharge part is wider than the region of the air film formed between the guide surface and the opposite surface while the opening adjusting part opens the discharge part.

8. The rotary table apparatus according to claim 6, wherein the negative pressure generating part has a nozzle restricting a flow path of compressed air, and
   the opening adjusting part supplies, between the guide surface and the opposing surface, compressed air having passed through the nozzle via the suction path by closing the discharge port.

9. The rotary table apparatus according to claim 1, wherein the opening adjusting part has a moving member that moves in a moving direction upon receiving the compressed air pressure corresponding to the load applied on the table part, and
   the moving member moves to adjust the size of a gap between the moving member and the discharge port.

10. The rotary table apparatus according to claim 9, wherein the moving member moves back and forth in the moving direction in response to a fluctuation of the compressed air pressure corresponding to a fluctuation of the load applied to the table part.

11. The rotary table apparatus according to claim 10, wherein the opening adjusting part further comprises a biasing member that biases the moving member so that the moving member is drawn away from the gap in the moving direction, and
    the moving member moves to approach the gap in the moving direction against a biasing force of the biasing member upon receiving the compressed air pressure.

12. The rotary table apparatus according to claim 9, wherein the moving member is a shaft member that moves in the moving direction upon receiving the compressed air pressure, and
    the shaft member has a tip end which is provided on the tip side and adjusts the size of the gap between the shaft member and the discharge port as the shaft member moves.

13. The rotary table apparatus according to claim 9, wherein the moving member includes:
   an elastic member capable of expanding and contracting in the moving direction under the pressure; and
   a pillar part that is provided on a tip side of the elastic member and moves in the moving direction in conjunction with expansion and contraction of the elastic member to adjust the size of a gap between the moving member and the discharge port.

* * * * *